Figure 1:
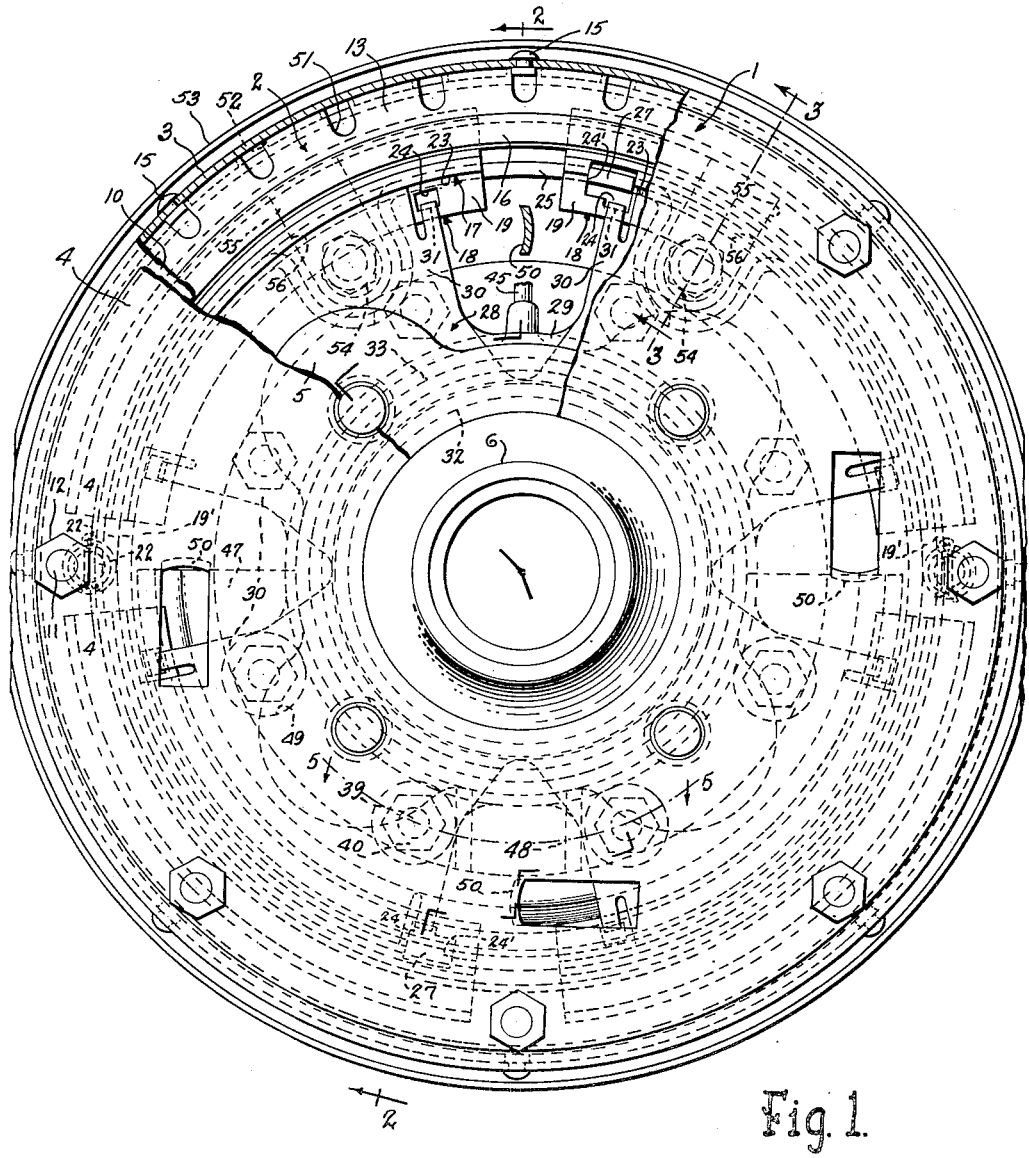
Figure 5:
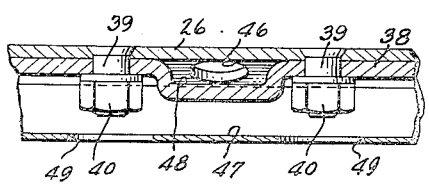

Feb. 16, 1943.　　　　P. M. FREER　　　　2,311,528
BRAKE
Filed Feb. 17, 1941　　　　2 Sheets-Sheet 1

INVENTOR.
Phelps M. Freer
BY Whittemore, Hulbert & Belknap
Attorneys

Feb. 16, 1943.  P. M. FREER  2,311,528
BRAKE
Filed Feb. 17, 1941  2 Sheets-Sheet 2
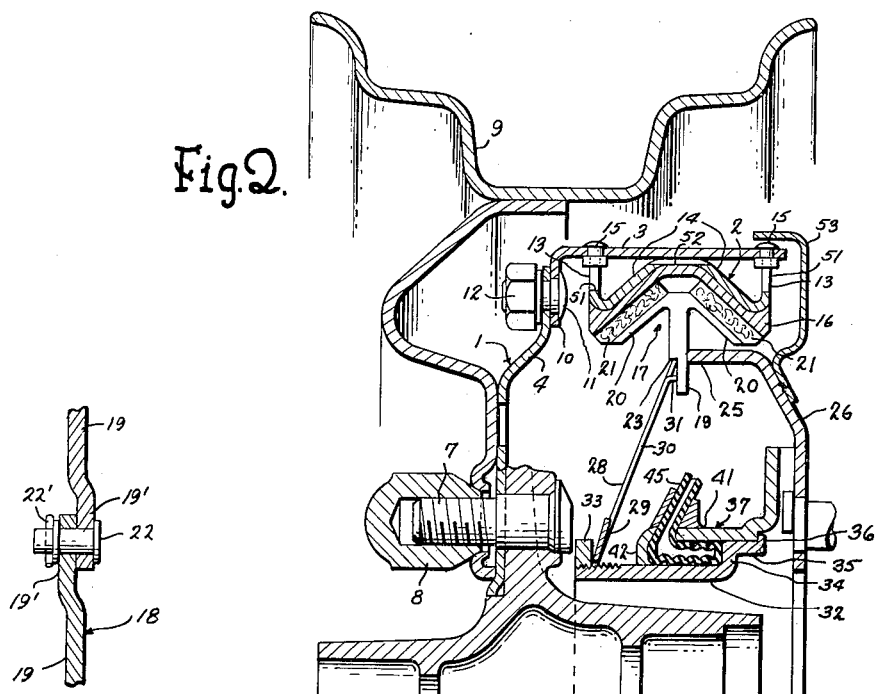
Fig. 2.
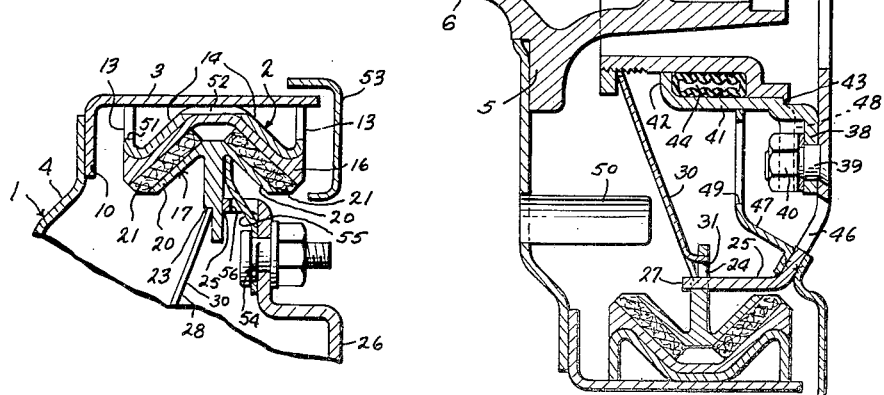
Fig. 4.
Fig. 3.
INVENTOR.
Phelps M. Freer
BY Whittemore, Hulbert & Belknap
Attorneys Patented Feb. 16, 1943

2,311,528

UNITED STATES PATENT OFFICE 2,311,528

BRAKE

Phelps M. Freer, Detroit, Mich.

Application February 17, 1941, Serial No. 379,313

5 Claims. (Cl. 188—78)

The invention relates to brakes for effecting a common state of rest of two relatively rotatable elements and refers more particularly to brakes especially applicable to motor vehicles.

The invention has for one of its objects to provide a powerful brake in which the frictionally engageable members may be readily centered with respect to each other.

The invention has for another object to provide the brake with air circulating means for removing the generated heat.

The invention has for further objects to provide an improved construction for actuating the movable friction member; to provide a simple construction for anchoring the shoes; and to provide an improved arrangement whereby the shoes may be adjusted.

With these and other objects in view, the invention resides in the novel features of construction and combinations and arrangements of parts, as more fully hereinafter set forth.

In the drawings:

Figure 1 is an elevation, partly broken away, of a brake embodying my invention;

Figures 2, 3, 4 and 5 are cross sections on the lines 2—2, 3—3, 4—4, and 5—5, respectively, of Figure 1.

The brake illustrated in the present instance is designed particularly for use in motor vehicles.

The rotatable element of the brake comprises the brake drum 1 and the friction member 2. The brake drum is formed of the ring 3 and the web 4, which latter is mounted upon the fixed flange 5 of the hub 6. The fixed flange is provided with the bolts 7 which secure the web to the fixed flange and which are threadedly engaged by the nuts 8 for detachably securing the wheel 9 to the fixed flange. The periphery of the fixed flange is indented between the bolts. The ring 3 is formed with the inturned radial flange 10 at its outboard end, which flange is detachably secured to the web 4 at its periphery by suitable means, such as the bolts 11 and the nuts 12. The friction member 2 is a ring of W-shaped section, preferably formed of sheet metal, it having the radial end walls 13 and the relatively inclined walls 14 converging with respect to each other in a radially outward direction toward a zone midway of the end walls. The friction member is driven with the ring by suitable means, such as the rivets 15, which are secured to the annular portion of the ring and have heads slidably engaged by the end walls of the friction member and permitting the latter to move axially relative to the ring. The friction member is also formed with the lining 16, such as cast iron, which is fused to the radially inner side of the inclined walls 14.

The non-rotatable element of the brake comprises the friction member 17 which is formed of the series of brake shoes 18 each having an arcuate body formed with the radial web 19 and the radially inwardly diverging flanges 20 integrally connected into the periphery of the web. Suitable linings 21 are secured to the flanges and are adapted upon radially outward movement of the shoes to engage the inclined radially inner sides of the lining 16. The shoes are symmetrically arranged with respect to the vertical diametral line and, as shown, are arranged in pairs with a pair at each side of this line. The adjacent ends of the shoes of each pair are operatively connected together by forming their webs 19 with the extensions 19' which are offset to overlap and to receive the headed pin 22 which is secured in place by suitable means, such as the cotter pin 22'.

The web of each shoe is provided with a radially inwardly facing arcuate shoulder 23 located on the outboard side. The web of each shoe is also formed at its ends with the arcuate openings 24, which have their radially inner edges near the radially inner edge of the web. The inboard side of the web slidably engages the annular axially extending flange 25 at the periphery of the fixed backing plate 26. The annular flange is provided at its upper and lower portions with the diametrically opposite axial projections 27 which are equidistant from the vertical diametral line and extend into the enlarged portions 24' of the openings 24 in the upper end of the upper shoe at the right hand side of the vertical diametral line and in the lower end of the lower shoe at the left hand side of the vertical diametral line. The projections provide slight or working clearance at the ends of the openings and appreciable clearance at the sides of the openings. The construction is such that the shoes are guided by the backing plate and its projections serve as abutments or anchors for limiting peripheral movement of the shoes. The construction is also such that each pair of shoes at the opposite sides of the vertical diametral line anchors at one end only.

For radially moving the shoes into engagement with the internal friction face of the friction member 2 and also out of engagement therewith, there is the resilient dished disc 28. This disc is formed of spring material and it is dished in an inboard direction and engages the webs 19 of the shoes and retains the webs against the edge of the peripheral axial flange 25 of the backing plate. The disc has the hub 29 and the spokes 30 radiating from the hub, there being preferably one spoke for each shoe. Each spoke has at its ends the integral axially extending projections or ears 31 which extend into the openings 24 in the webs of the associated shoes and are engageable with the radially inner edges of the openings to move the shoes radially inwardly and away from the friction member 2. Slight clearance is provided between the projections or ears and the ends of the openings. The periphery of each spoke between the projections or ears 31 is engageable with the arcuate shoulder 23 of the web of the associated shoe to move the latter radially outwardly into engagement with the friction member 2. The construction is such that each spoke is connected to its shoe to positively move the same radially toward and away from the internal friction face of the friction member of the brake drum without any lost motion, it being apparent that the inherent resiliency in the disc causes the retraction of the shoes. At the same time each spoke provides for peripheral movement of its associated shoe so that each spoke is free from torsion, except that resulting from friction between the associated shoe and the spoke when the shoe moves peripherally relative to the spoke.

The disc 28 is adapted to be flattened to move the shoes radially outwardly by reciprocable means operatively connected to the hub of the disc. In detail, 32 is a sleeve encircling the inboard portion of the barrel of the hub 7 and extending freely through the hub 29 of the disc when the latter is in its normal position. 33 is a nut threaded on the outboard end of the sleeve and abutting the outboard face of the hub at its inner edge. The nut is adjustable to maintain a predetermined clearance between the shoes and the friction member engageable thereby. The inboard end of the sleeve 32 is formed with the radial flange 34 and the axial flange 35, the latter at its end having the outwardly extending annular flange 36. 37 is a collar having a radial flange 38 which is fixedly secured to the backing plate 26 by suitable means, such as the bolts 39 and the nuts 40. This collar is concentrically located on the backing plate and has the axial portion 41 which is slidably engaged by the axial flange 35 of the sleeve 32. The outboard end of the collar is provided with the radially inwardly extending flange 42 which is slidably engaged by the main portion of the sleeve 32. The collar is also provided with the radially extending annular shoulder 43 which is engageable by the annular flange 36 of the sleeve to limit axial movement of the sleeve in an outboard direction. It will be noted that the construction of the sleeve and collar is such that an annular space is formed thereby for receiving the brake actuator which in the present instance is the expansible member 44 which is in the nature of an annular tube preferably formed of rubber and having corrugated radially inner and outer walls. It will also be noted that the axial flange 35 has a length sufficient for a portion thereof to engage the axial portion 41 of the collar at all times so that the expansible member 44 can not engage the annular shoulder 43 and be damaged. The expansible member is preferably integral with the tube 45 which is adapted to be connected to a suitable source to conduct braking fluid under pressure from the source to the expansible member.

The backing plate 26 is provided in its lower portion with the opening 46 which serves both as an oil drain and an air intake. To guide the oil to the opening there is the sheet metal guard 47 secured to the backing plate as by being welded thereto and having a radial wall clearing the nuts 40 and terminating adjacent to the axial portion 41 of the collar. This guard is substantially semi-circular. To permit oil to drop into the space formed by the guard and the lower portion of the backing plate, the radial flange 38 of the collar is axially offset to form the channel 48. To provide access to the bolts 40, the radial portion of the guard is formed with the openings 49 of sufficient size to permit the passage therethrough of a socket wrench.

To secure air circulation within the brake, there is the annular series of fan blades 50 rotatable with the brake drum. These blades are preferably formed by striking the same out from the web 4 and they are located to extend through the spaces formed by the indentations in the periphery of the fixed flange 5 of the hub. It will be noted that when the wheel 9 is secured to the hub, it covers the openings formed by striking out the blades. To more effectively conduct the generated heat away from the friction member 2 of the brake drum, the end walls 13 of the friction member are formed with the axial openings 51 and the radially outer ends of the inclined walls 14 at their junction are formed with the axial openings 52. The edges of certain of the openings 51 in the end walls slidably engage the rivets. The construction is such that the fan blades 50 draw air inwardly through the opening 46 in the backing plate 26 and force the major portion of this air radially outwardly along the web 4 and then axially in an inboard direction through the openings 51 and 52 to finally emerge between the guard 53 upon the backing plate and the ring 3. The fan blades 50 also force some of the air against the movable friction member 17 and between the ends of its shoes to finally emerge between the guard 53 and the ring 3.

For the purpose of adjusting the shoes to center the same in the friction member 2, I have provided the pair of eccentrics 54 rotatably mounted in the upper portion of the backing plate 26 equidistant from the vertical diametral line. Resilient sheet metal clips or fingers 55 mounted on these eccentrics extend upwardly through the openings 56 in the peripheral flange 25 and along the sides of the webs 19 of the adjacent shoes and abut at their upper ends the adjacent flanges 20. Upon angular rotation of the eccentrics, it will be seen that the shoes and the disc for actuating the same may be raised or lowered substantially parallel to the vertical diametral line inasmuch as the lower shoes are directly connected to the upper shoes, which are directly adjusted by the eccentrics. The clearance between the hub of the disc and the actuating sleeve permits the adjustment.

What I claim as my invention is:

1. In a brake, a brake drum, a radially movable friction member, a friction member within and mounted on said brake drum for frictional engagement by said first mentioned friction member, said second mentioned friction member being provided with openings for the passage of air, a backing plate for guiding said first mentioned friction member provided with an opening forming an oil drain and an air intake, and air circulating means rotatable with said drum for drawing air through the opening in said backing plate and forcing the air through the openings in said second mentioned friction member.

2. In a brake, the combination of two relatively rotatable elements, one of said elements comprising a radially movable friction member adapted to operatively engage the other of said elements, actuating means for said friction member comprising a member the inner portion of which is axially movable and the outer portion of which is radially movable, said outer portion being operatively connected to said friction member, a backing plate, a collar mounted on said backing plate, a sleeve operatively connected to the inner portion of said actuating member and telescopically engaging said collar, and means between said collar and sleeve for moving said sleeve.

3. In a brake, the combination of two relatively rotatable elements, one of said elements comprising a radially movable friction member adapted to operatively engage the other of said elements, actuating means for said friction member comprising a member the inner portion of which is axially movable and the outer portion of which is radially movable, said outer portion being operatively connected to said friction member, a backing plate for guiding said friction member, a collar upon said backing plate, a sleeve operatively connected to the inner portion of said actuating member and telescopically engaging said collar, said collar and sleeve having cooperating portions forming an annular space, and an expansible member within said space for moving said sleeve.

4. In a brake, the combination of two relatively rotatable elements, one of said elements comprising a friction member movable into engagement with the other of said elements, a backing plate, a collar on said backing plate having a generally radially extending flange, and means for actuating said friction member comprising a sleeve operatively connected to the same and telescopically engaging said collar, said sleeve having a generally radially extending flange spaced from said first mentioned flange, said sleeve cooperating with said collar to form an annular chamber, and an expansible actuating member within the chamber.

5. The combination of two relatively rotatable elements, one of said elements having an internal friction face and the other of said elements comprising an annular series of shoes movable radially into engagement with said friction face, a resilient dished spoked disc for radially moving said shoes into engagement with said friction face, said disc having a spoke for each shoe providing for peripheral movement of the shoe relative to the spoke, a backing plate, a pair of fixed anchors on said backing plate with the anchors on opposite sides of transverse diametral lines, said series of shoes comprising a plurality of shoes on each side of one of said diametral lines and operatively connected to each other with a shoe of each plurality engageable with a different one of said anchors, and adjustable means on said backing plate engageable with certain of said shoes of each plurality to bodily move the same substantially parallel to one of said diametral lines.

PHELPS M. FREER.